Figure 1:
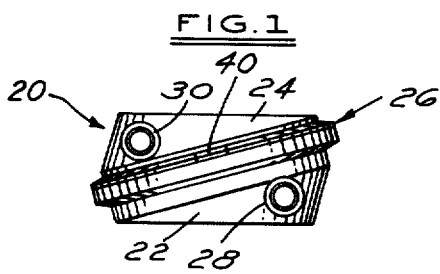

United States Patent
Robrecht et al.

[15] 3,693,410
[45] Sept. 26, 1972

[54] DISPOSABLE AIR SAMPLING FILTER CASSETTE

[72] Inventors: Charles J. Robrecht; John S. Wyman, Jr., both of Ann Arbor, Mich.

[73] Assignee: The Bendix Corporation

[22] Filed: Feb. 2, 1970

[21] Appl. No.: 7,458

[52] U.S. Cl. ............................73/28, 55/18, 55/510, 55/511, 128/142.6
[51] Int. Cl. ........................G01n 31/00, B01d 49/00
[58] Field of Search..........55/18, 337, 445, 451, 494, 55/501, 504, 510, 511; 73/23, 28, 170, 432 PS; 210/304

[56] References Cited

UNITED STATES PATENTS

| | | | |
|---|---|---|---|
| 1,231,371 | 6/1917 | Jones | 55/451 |
| 2,192,968 | 3/1940 | Fieser | 55/511 |
| 3,092,583 | 6/1963 | Wolff et al. | 73/28 |
| 3,171,726 | 3/1965 | Roney et al. | 55/387 |
| 3,295,359 | 1/1967 | Peck | 73/28 |
| 3,487,624 | 1/1970 | Tignanelli | 55/511 |

*Primary Examiner*—Charles N. Hart
*Attorney*—Plante, Hartz, Smith & Thompson

[57] ABSTRACT

A composite filter unit and cassette to serve as an air sampler for personal use in connection with a metering pump and a cyclone unit. The filter unit is formed of two opposed shells with interfitting flanges to provide a support for the circumferential edges of a filter disc and to form chambers on each side of the disc, one to serve as an inlet and one to serve as an outlet. The chambers are provided with tangential openings so that inlet air is directed parallel to the disc in a toroidal path where it can flow uniformly through the filter disc to the opposed chamber and outlet. The composite filter unit is encapsulated in a cassette during use to protect it against outside contamination, the encapsulator having a special configuration for cooperation with a garment support bracket.

7 Claims, 12 Drawing Figures

PATENTED SEP 26 1972 3,693,410

SHEET 1 OF 3

INVENTORS
CHARLES J. ROBRECHT
JOHN S. WYMAN, JR.
BY
Barnes, Kisselle,
Raisch & Choate
ATTORNEYS

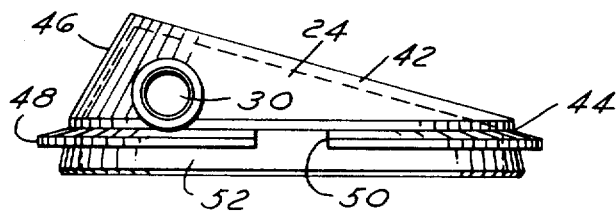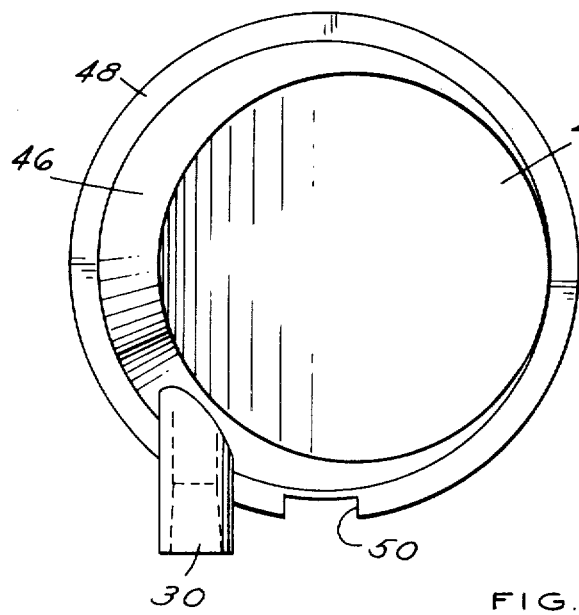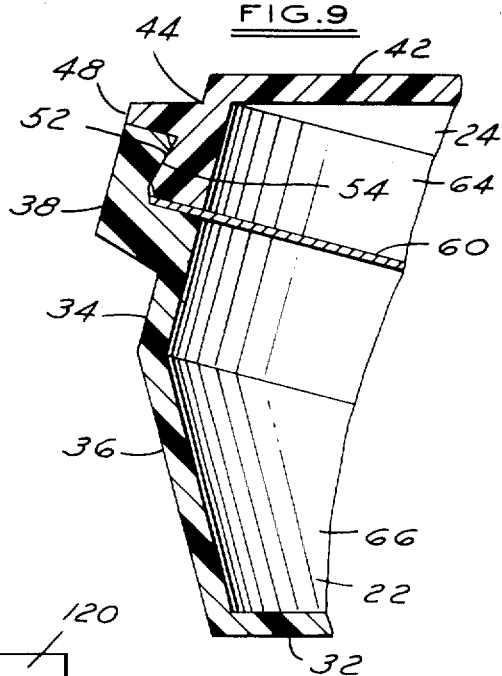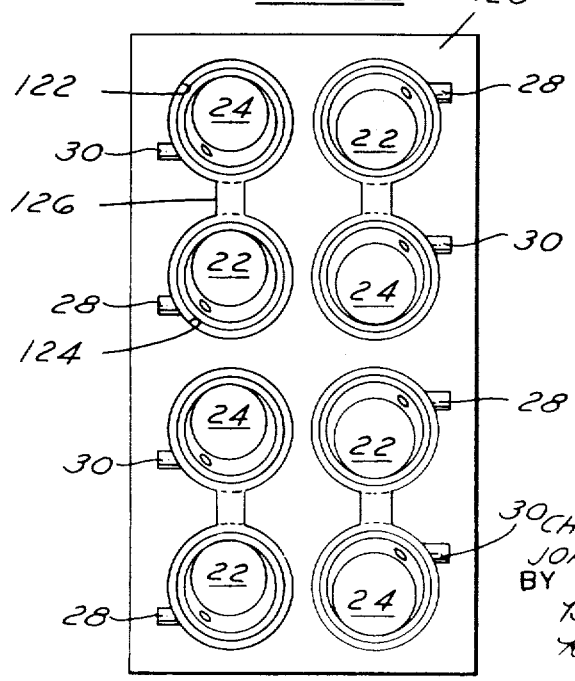

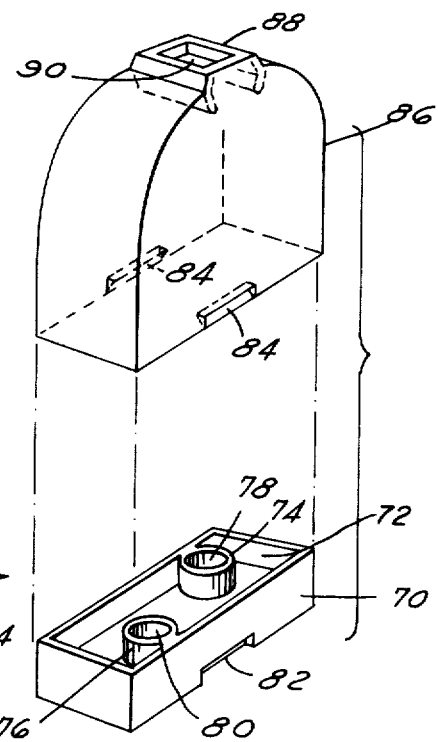
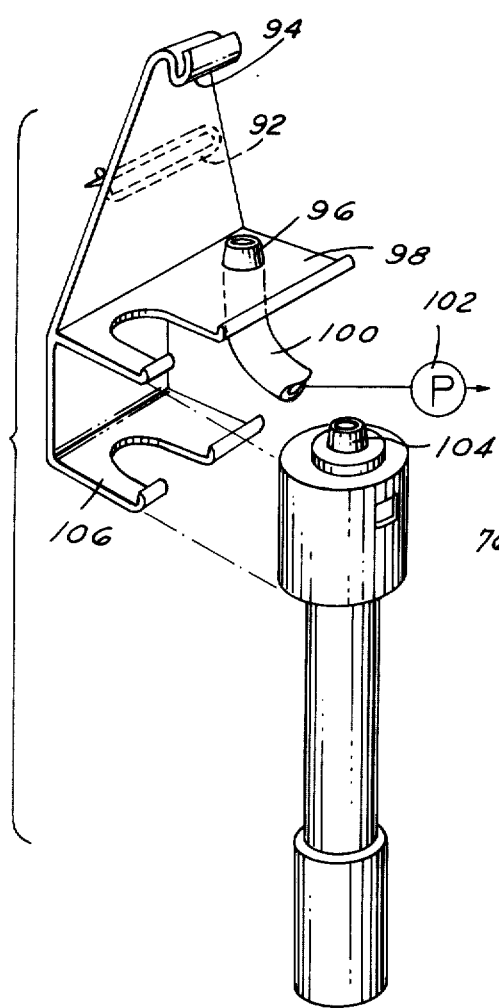

DISPOSABLE AIR SAMPLING FILTER CASSETTE

This invention relates to a Disposable Air Sampling Filter Cassette and more particularly to a cassette for use by individuals such as coal miners to monitor air which is being breathed under mining conditions. The purpose of the device is to collect respirable dust samples which can be checked to determine conditions in a particular mining area.

It is an object of the invention to provide an improved filter holder which can be pre-weighed and post-weighed relative to a period of use to obtain a reading on conditions of particular air which is being breathed by individuals in any selected environment.

It is desirable that the device be relatively inexpensive so that it may be disposed of after use. It is also desirable that the device be symmetrical in the sense that flow may take place in either direction, thus insuring correct installations. It is likewise desirable that the device be such that there is no direct impact on the filtering membrane and that there be a relatively uniform load of the membrane during use.

Another desirable feature is a relatively low silhouette dimension, that is, overall thickness, so that the device does not project unduly from the garment of the worker on which it is suspended.

It is a further object of the present invention to provide a filter cassette which has the above-listed desirable features and which also has a resulting aerodynamic flow pattern which is advantageous.

Other objects and features of the device relating to details of construction and operation will be apparent in the following description and claims in which the principles of the invention are set forth in connection with the best mode presently contemplated for the invention.

Figure 2:
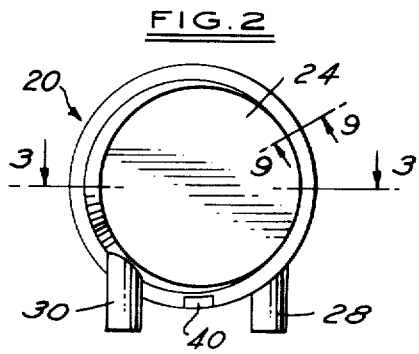
Figure 3:
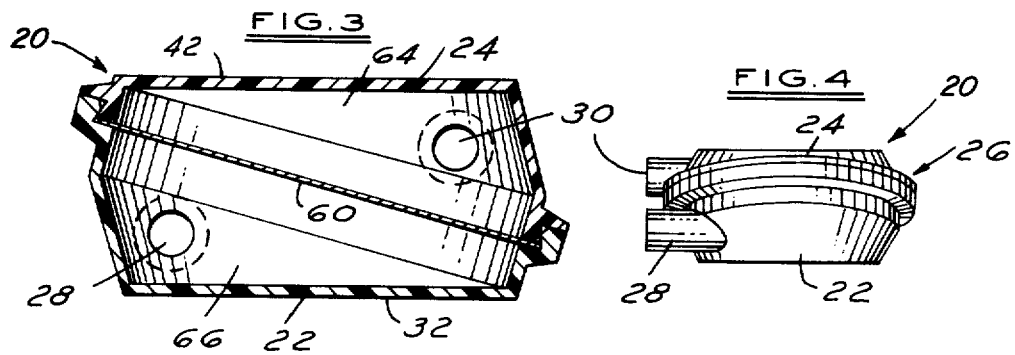
Figure 4:
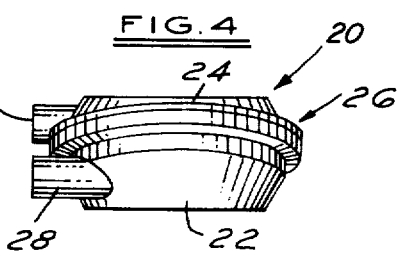
Figure 5:
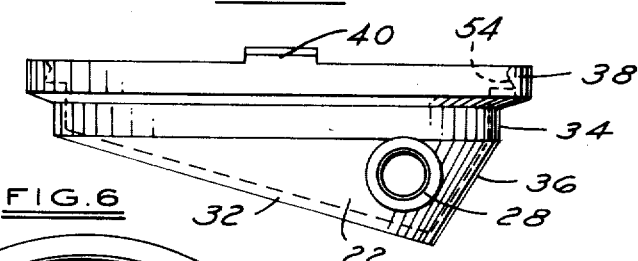
Figure 6:
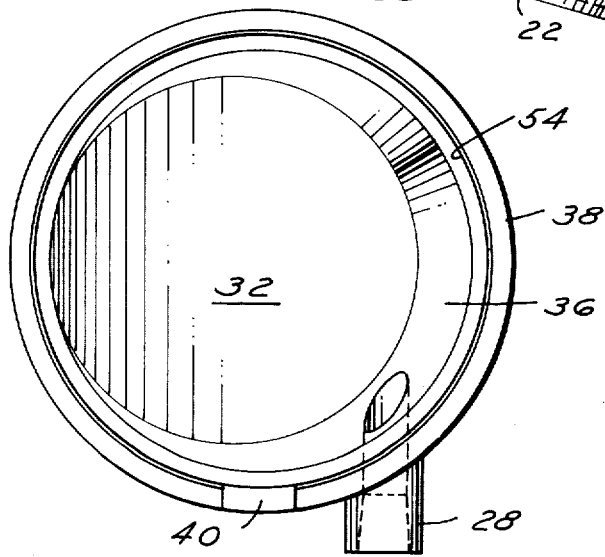

Drawings accompany the disclosure and the various views thereof may be briefly described as follows:

FIG. 1, an end view of the filter holder.
FIG. 2, a plan view of the filter holder.
FIG. 3, a sectional view on line 3—3 of FIG. 2.
FIG. 4, a side elevation of the holder.
FIG. 5, an end view of one-half of the filter shell.
FIG. 6, an inside view of the unit of FIG. 5.
FIG. 7, an end view of a second half of the filter shell.
FIG. 8, a plan view of the second half.
FIG. 9, a fragmentary sectional view on line 9—9 of FIG. 2.
FIG. 10, a view of a filter holder cassette.
FIG. 11, a view of an assembly of a holder for the filter and cassette.
FIG. 12, a view of an open mold showing a multiplicity of cavities and double filter shells contained therein.

Referring to the drawings:

The filter holder 20, shown in FIGS. 1, 2 and 3, is illustrated as formed of two approximately identical shell portions 22 and 24 joined together on a diagonally positioned telescoping rim section illustrated generally at 26. Each shell has a tangentially located entrance tube respectively designated 28 and 30. In FIG. 4, the assembly is shown from a side view. In FIGS. 5 and 6, details of the shell 22 are shown. The outer wall, circular in contour, is shown at 32 slanting down to a side wall 34 and terminating at the other end in an angular wall 36 which has its widest portion as shown at the right-hand side of FIG. 5 and tapers down to meet the annular wall 34. The annular wall 34 merges into a flange 38 forming a portion of the joint 26, this flange having a short tab 40 formed to register with a corresponding recess in a telescoping flange in the other part 24.

In FIGS. 7 and 8, the part 24 is illustrated having the circular panel wall 42 merging into a short annular wall 44 at one side and joining at the other side a wall 46 which again tapers from its widest portion at the left-hand portion of the drawing down to the wall 44 around the device. Tube 30 projects out of the wall 36 and this shell portion also has a flange with a recess 50 for registering with the tab 40 and a telescoping portion 52 which has a snap-in fit with the interior wall 54 of the flange 38 of shell 22.

FIG. 9 illustrates an enlarged section of these portions in telescoped relation, and it will be seen that there is locked between the flat annular flanges of the telescoping portions the annular rim of a filter disc 60. This is also shown in the sectional view in FIG. 3. Thus, the telescoping portion 52 is received snugly into the recess 54 and the annular edge 62 of the filter disc 60 is trapped between these parts and mechanically held to support the disc as it extends between the two shells to form chambers on each side thereof.

Thus, it will be seen that each chamber on each side of the membrane disc is wide at one periphery and narrow at the other, these chambers being designated as 64 and 66 in FIG. 3. Thus, functionally, the chambers are identical and the inlets and outlets 28 and 30 are identical so that each may serve either as an inlet or an outlet depending on which way the unit is assembled for use. It will be seen that air which is entering, for example, the tube 28 as an inlet, will be entering the chamber essentially in a tangential direction and also the flow is parallel to the filter disc rather than against it. The flow tends to be directed in a circular motion by the walls of the shell and thus there is no one spot on the filter which is subjected to a direct blast from the inlet.

Similarly, on the outlet, the flow from the tube 30 will be essentially tangential of the chamber in shell 24. The tab 40 in relation to the recess 50 registers the shells so that the two tubes 28 and 30 are essentially parallel in assembly and spaced axially of the general central axis of the assembled shells.

In FIG. 10, a capsule or cassette unit for the filter chambers is shown, the parts being separated for convenience in understanding the structure. The capsule or cassette consists of a base 70 having an internal recess 72 with two molded posts 74 and 76 which extend through the thickness of the unit and are provided with holes 78 and 80. The bottom edges of the base are provided with recesses 82 on each side to register with the snap projections 84 on the interior walls of the top portion 86 which telescopes down over the base 70. The top portion has a rectangular dome 88 with a recess 90 which is used for retention of the device as will be later explained.

In assembly, the tubes 28 and 30 project into the openings 78 and 80 so that the assembled shell unit 20 will lie completely inside the cassette shell 86. The cassette may then be assembled on a supporting bracket 90 shown in FIG. 11, this supporting bracket having a pin 92 for supporting the assembly on the garment of a worker. At the top of the bracket 90 is a downturned spring element 94 which will engage the recess 90 of the cassette. A small apertured protrusion 96 on a wall 98 of the support engages with opening 78 in a sealed relationship so that a hose 100 leading to a metering pump 102 is connected to the inside of the filter shell. The other hold 80 is connected to the top of a cyclone element 104 supported between the bracket wall 98 and a bracket wall 106 in suitable notches in these walls.

Thus, the metering pump will pull the air in the vicinity of the person wearing the device through the cyclone unit up through the metering chambers and to a suitable exhaust. The device is intended to be worn in the vicinity of the face of the wearer, as, for example, a coal miner to sample the air which is being breathed by the wearer. The cyclone element will eliminate heavy particles and the filter element will register by direct deposit such particles as might be breathed into the lungs of a person in the vicinity.

It is intended that the shell device with the captured filter disc will be weighed prior to use and subsequently weighed after a designated period of use such as, for example, an 8-hour shift. The cassette 86 with the base 70 will prevent the outside of the shell filter from becoming contaminated which might change the weight differential. Once the miner has turned in the sampler device, the cassette is removed and the assembled shell device with the filter intact is weighed by very accurate scales to determine its final weight so that the differential which registers the deposit on the filter can be determined.

In FIG. 12, a mold unit for the shells is shown at 120 having a series of mold apertures 122 and 124 for the shells 22 and 24. These shells are preferably connected by a hinged portion 126 which is molded from the same material as the shells and attached to the flanges thereof in such a way that the shells can be moved together with considerable ease by an assembler.

In some instances, if this hinge is made fairly resistant to torsion, it may serve as a suitable registry unit so that the tab 40 is not required. Joining the shells in pairs has another advantage in that there is always a weight differential and pairing up the shells reduces the problems of pre-weighing by reducing the combinations of the opposite shells.

We claim:

1. A method of monitoring and determining the contaminant content of respirable air breathed into the lungs by an individual in a specific environment which comprises:
   a. providing a filter sheet with an enclosure having an inlet chamber on one side and an outlet chamber on the other side,
   b. encapsulating the filter sheet enclosure in a capsule having an inlet and outlet to connect to said chamber,
   c. weighing the enclosure and recording the weight relative to the enclosure,
   d. placing the capsule and enclosure in a portable air metering circuit and passing respirable air from the vicinity of air to be breathed into the lungs of the wearer through the filter to collect contaminants on the filter sheet for a predetermined period of time,
   e. removing the enclosure from the capsule, and
   f. weighing the exposed enclosure to determine the variant weight resulting from the contaminant.

2. A contaminant collector for use with an air sampling apparatus which comprises a substantially cylindrical chamber formed of molded parts having a filter sheet disposed in said chamber to divide it into inlet and outlet chambers, said sheet positioned to extend at an acute angle to the general axis of said container to divide the container into respectively inlet and outlet compartments, having a relatively short axial dimension at one side and a relatively long axial dimension at the other side, and means forming inlet and outlet passages in said respective chambers positioned in the general vicinity of the largest axial dimension and extending in parallel directions.

3. A contaminant collector as defined in claim 2 in which said inlet and outlet passages extend on axes substantially parallel to the plane of said sheet.

4. A contaminant collector for use with an air sampling apparatus which comprises a substantially cylindrical chamber formed of molded parts having a filter sheet disposed in said chamber to divide it into inlet and outlet chambers, said sheet positioned to extend at an acute angle to the general axis of said container to divide the container into respectively inlet and outlet compartments, having a relatively short axial dimension at one side and a relatively long axial dimension at the other side, means forming inlet and outlet passages in said respective chambers positioned in the general vicinity of the largest axial dimension and extending in parallel directions, a two-part encapsulating container comprising a base for mounting said collector, means on said base to register with and engage in sealing relation with said means forming said inlet and outlet passages of said collector, and a body portion engageable in telescoping relation with said base to enclose said collector when mounted on said base.

5. A portable apparatus for determining the contaminant content of respirable air which comprises:
   a. a support means to be mounted on an individual to receive air from a metering device,
   b. a contaminant collector carried by said support means formed of shells joined at facing rims to provide inlet and outlet chambers,
   c. means within said collector to support a sheet of filter material between said chambers,
   d. said inlet and outlet chambers having openings to serve respectively as inlet and outlets for metered air positioned to direct air initially into one of said chambers from said inlet opening in a direction substantially parallel to said sheet of filter material,
   e. an encapsulating container for said contaminant collector having inlet and outlet openings positioned to interfit with said inlet and outlet, and
   f. means on said container to facilitate positioning on said support means to be mounted on an individual.

6. A portable apparatus for determining the contaminant content of respirable air which comprises:
   a. a support means to be mounted on an individual to receive air from a metering device,
   b. a contaminant collector carried by said support means formed of shells joined at facing rims to provide inlet and outlet chambers, c. means within said collector to support a sheet of filter material between said chambers, d. said inlet and outlet chambers having openings to serve respectively as inlet and outlets for metered air positioned to direct air initially into one of said chambers from said inlet opening in a direction substantially parallel to said sheet of filter material, said support means comprising a back plate having fastening means to attach to the garment of a wearer, and e. a plurality of parallel support shelves extending from said back plate, one of said shells being positioned to carry said contaminant collection.

7. An apparatus as defined in claim 5 in which said support means comprises a back plate having at least one shelf extending at right angles to support said container, means on said shelf for receiving air inlet and outlet passages to pneumatically connect with similar passages in said container, and means on said back plate and means on said container to interengage to lock said container on said back plate.

* * * * *